United States Patent [19]

Nagashima

[11] Patent Number: 4,747,573
[45] Date of Patent: May 31, 1988

[54] INNER MOLD FOR MOLDING CYLINDER

[75] Inventor: Akira Nagashima, Kawasaki, Japan

[73] Assignee: Kioritz Corporation, Tokyo, Japan

[21] Appl. No.: 71,745

[22] Filed: Jul. 9, 1987

[30] Foreign Application Priority Data

Jul. 24, 1986 [JP] Japan ............................ 61-112797[U]

[51] Int. Cl.$^4$ ............................................. B29C 39/32
[52] U.S. Cl. .................................... 249/184; 164/369; 425/468
[58] Field of Search ................ 164/369, 370; 249/122, 249/142, 124, 175, 186, 184; 425/468

[56] References Cited

U.S. PATENT DOCUMENTS 1,931,587 10/1933 McConnel ............................ 249/148
3,044,127 7/1962 Alden ................................... 425/468

Primary Examiner—Willard Hoag
Attorney, Agent, or Firm—Browdy and Neimark

[57] ABSTRACT

An inner mold for molding a cylinder having a bore-forming core for forming a cylinder bore, and a shell core for forming a recess in the cylinder that can serve as, for instance, a scavenging passage. Holes are formed in the bore-forming core for allowing the shell core to fittingly engage with the bore-forming core, and the bottom surfaces of each of the holes are arcuately concaved.

2 Claims, 1 Drawing Sheet

INNER MOLD FOR MOLDING CYLINDER

BACKGROUND OF THE INVENTION

1. Field of the Invention

The present invention relates to an inner mold for molding a cylinder, which inner mold has a bore-forming core for forming a cylinder bore and a shell core disposed in fitting engagement with holes formed in the bore-forming core for forming a recess in the cylinder wall such as scavenging passages.

2. Description of the Prior Art

A type of inner mold has been used in molding, for instance, a cylinder of an air-cooled 2-cycle internal combustion engine which has two scavenging passages. However, the arrangement of a conventional inner mold of this type, described in detail later with reference to a drawing, has the following disadvantages. That is, when the molding has been completed and when it is necessary to remove projections of the shell core where the shell core has been kept in fitting engagement with the bore-forming core and which remain within rectangular holes of the bore-forming core after the bore-forming core and the other portion of the shell core have been pulled out from the cylinder, the operator has to manually crush the remaining projections of the shell core into pieces, and these crushed pieces of the shell core have to be blown off by, for example, air under high pressure. Thus, this operation of removing the remaining portions of the shell core from the bore-forming core requires a time-consuming manual operation, thereby leading to the problem that the automatization of cylinder molding may be hindered, as well as the fact that the mold sand may scatter and polute the surroundings.

SUMMARY OF THE INVENTION

Accordingly, an object of the present invention is to solve the problems of the conventional inner mold and to provide an inner mold for molding a cylinder which has a simple and convenient shape.

An inner mold for molding a cylinder in accordance with the present invention has a bore-forming core and a shell core, the bore-forming core having holes formed therein for allowing the shell core to be disposed in fitting engagement therewith. The inner mold of the present invention is characterized in that each of the holes of the bore-forming core has a bottom surface formed with an arcuately concaved surface.

With the inner mold of the present invention having the above-described arrangement, when the molding has been completed and when the bore-forming core has been pulled out of the cylinder bore, projections of the shell core which remain in the holes of the bore-forming core can be easily removed therefrom since the entire portions of the remaining projections can each be pivotally moved along the corresponding arcuately concaved surface that forms the bottom surface of the hole with ease by strongly pushing one of the side end portions of the remaining projection. That is, the arrangement of the inner mold of the present invention enables both mounting and removal of the shell core to be facilitated and the entire molding process to be unmanned, thus enabling a fully automatized continuous molding operation and production of cylinders in large batches and at a low production cost without the risk that crushing of the remaining portions of the shell core may pollute the surroundings and with the possibility of increasing the strength and durability of the bore-forming core.

DESCRIPTION OF THE PREFERRED EMBODIMENT

Figure 2:
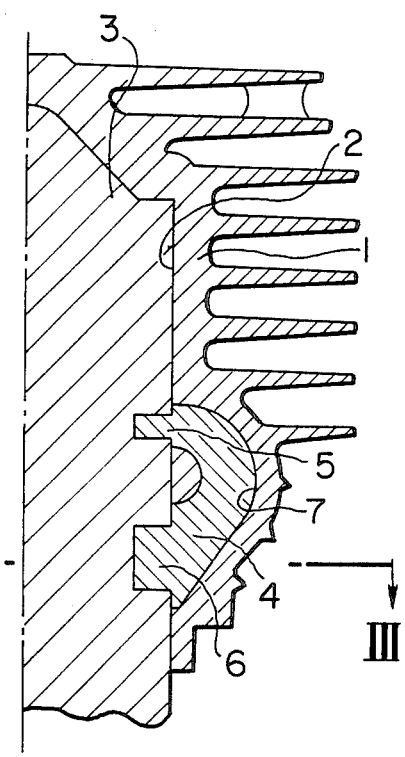
FIG. 2 is a longitudinal sectional view of one half of an inner mold during the molding of a cylinder.

The aforesaid conventional inner mold will first be described in detail with reference to FIG. 2.

The conventional inner mold of the aforesaid type has a bore-forming core 3 for forming a cylinder bore 2 of a cylinder 1, and an arch-shaped shell core 4 mounted on the bore-forming core 3 for forming a scavenging passage in the cylinder wall. Both axial end portions 5 and 6 of the shell core 4 have rectangular fitting-engaging projections formed thereon, while the outer peripheral surface of the bore-forming core 3 has rectangular holes formed therein in correspondence with the fitting-engaging projections of the shell core 4. Thus, when the rectangular fitting-engaging projections at both end portions 5 and 6 of the shell core 4 are brought into fitting engagement with the respective rectangular holes of the bore-forming core 3, the shell core 4 is mounted onto the bore-forming core 3. After the cylinder 1 has been molded, the bore-forming core 3 is pulled out of the cylinder bore 2 while the shell core 4 still remains in the cylinder 1, the shell core 4 is then pulled out from the cylinder 1 by, for instance, forced vibration, and the fitting-engaging projections of the shell core which get torn from the other part of the shell core when the bore-forming core is pulled out and which remain within the rectangular holes of the bore-forming core are then removed from the rectangular holes, so that the bore-forming core 3 can be reused.

However, as stated before, this conventional inner mold with the above-described arrangement suffers from the problems outlined above.

Figure 1:
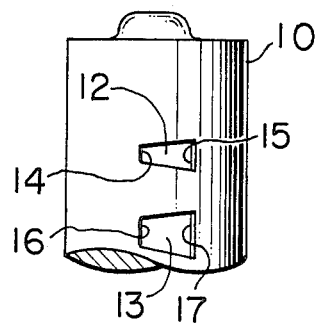
FIG. 1 is a side view of essential parts of a bore-forming core of an inner mold for molding a cylinder in accordance with an embodiment of the present invention.
Figure 3:
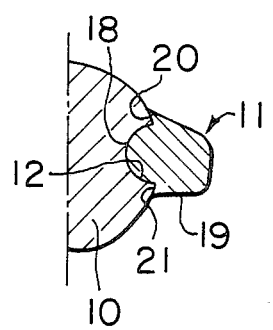
FIG. 3 is a cross-sectional view of the bore-forming core and a shell core of the present invention, taken along the line III—III in FIG. 2.

An inner mold in accordance with an embodiment of the present invention will now be described with reference to FIGS. 1 to 3.

The inner mold of the invention has a bore-forming core 10 made of steel and used in forming a cylinder bore of a cylinder provided with two scavenging passages of an air-cooled 2-cycle internal combustion engine, and an arch-shaped crushable shell core 11 mounted on the bore-forming core 10. Two or upper and lower holes 12 and 13 are formed in the outer peripheral surface of the bore-forming core 10 in such a manner that they are disposed away from each other in the axial direction of the core 10 and that each of them is elongate in the circumferential direction of the core 10. The upper hole 12 has a configuration which is tapered in the cross-sectional direction and in which the axial width gradually increases from one circumferential end 14 to the other circumferential end 15. The upper hole 12 also has a bottom surface formed with an arcuately concaved surface which is deepest at a middle portion thereof between the circumferential ends 14 and 15. Similarly, the lower hole 13 has a configuration which is tapered in the cross-sectional direction and in which the axial width gradually increases from one circumferential end 16 to the other circumferential end 17, and a bottom surface formed with an arcuately concaved surface which is deepest at a middle portion thereof between the circumferential ends 16 and 17.

The arch-shaped core 11, which is used in forming a scavenging passage of the cylinder, has on its axial end portions two fitting-engaging projections projecting therefrom. Each of these projections is so formed as to fittingly engage with the corresponding hole 12 or 13 of the bore-forming core 10. More specifically, the projection 18 that is to be brought into fitting engagement with the lower hole 13 of the bore-forming core 10 is formed with a configuration which is complementary with that of the lower hole 13 so as to be fitted therein and engaged therewith without any gap. Similarly, the other projection (not shown) that is to be brought into fitting engagement with the upper hole 12 of the bore-forming core 10 is also formed with a configuration which is complementary with that of the upper hole 12 so as to be fitted therein and engaged therewith without any gap. In addition, the axially lower end portion 19 of the shell core 11 on which the fitting-engaging projection 18 is formed has shoulder portions 20 and 21 which are brought into engagement with portions of the bore-forming core 10 in the vicinity of the circumferential ends 16 and 17 of the lower hole 13. Similarly, the axially upper end portion (not shown) of the shell core 11 on which the other fitting-engaging projection is formed has shoulder portions which are brought into engagement with portions of the bore-forming core 10 in the vicinity of the circumferential ends 14 and 15 of the upper hole 12. The above-described arrangement enables the shell core 11 to be accurately positioned and mounted on the bore-forming core 10.

After the cylinder has been molded by using the bore-forming core 10 on which the shell core 11 is mounted, the bore-forming core 10 is pulled out from the cylinder bore of the cylinder. At this time, only the fitting-engaging projections of the shell core 11 which remain fitted in and engaged with the holes 12 and 13 of the bore-forming core 10 are cut off from the other part of the shell core 11 by the relative sliding movement of the bore-forming core 10 in the cylinder bore and are pulled out together with the bore-forming core 10. After the bore-forming core 10 has thus been pulled out, when the side portion of the projection 18 remaining in the hole 13 of the bore-forming core 10 that is in the vicinity of the circumferential end 16 of the hole 13 having a smaller width is strongly pushed, the entire projection 18 pivotally moves so as to be pushed out of the hole 13 from its circumferential end 17 which has a larger width. In this way, the entire projection 18 can be removed from the core 10 with ease. The other projection remaining in the upper hole 12 of the core 10 can also be removed from the core 10 in a similar way to the removal of the projection 18. So long as the bottom surfaces of each of the holes 12 and 13 are arcuately concaved, the configuration of its opening into the outer surface of the bore-forming core 10 is not limited to a rectangular shape, and may be circular if desired. However, the configuration in the illustrated embodiment provides easier removal of the projections.

I claim:

1. An inner mold for molding a cylinder having a bore-forming core for forming a cylinder bore, and a shell core disposed in fitting engagement with holes formed in said bore-forming core for forming a recess in the cylinder wall which may be used as a scavenging passage, the bottom surface of each of said holes of said bore-forming core being formed with an arcuately concaved surface.

2. An inner mold for molding a cylinder according to claim 1, wherein one circumferential end of each of said holes has a width greater than that of the other circumferential end.

* * * * *